(12) United States Patent
Sathish et al.

(10) Patent No.: US 9,146,123 B2
(45) Date of Patent: Sep. 29, 2015

(54) METHOD AND SYSTEM FOR PROVIDING DRIVING DIRECTIONS

(75) Inventors: Sriram Jayaprakash Sathish, Bangalore (IN); Balaji Kannan, Chennai (IN)

(73) Assignee: YAHOO! INC., Sunnyvale, CA (US)

( * ) Notice: Subject to any disclaimer, the term of this patent is extended or adjusted under 35 U.S.C. 154(b) by 631 days.

(21) Appl. No.: 12/782,714

(22) Filed: May 19, 2010

(65) Prior Publication Data

US 2011/0288764 A1    Nov. 24, 2011

(51) Int. Cl.
*G01C 21/36* (2006.01)
*H04W 4/14* (2009.01)

(52) U.S. Cl.
CPC ............ *G01C 21/3626* (2013.01); *H04W 4/14* (2013.01)

(58) Field of Classification Search
CPC .......... G01S 19/258; G01S 2205/006; H04M 1/72522; H04M 1/7253; H04M 1/72572; H04M 2250/02; H04M 2250/06; H04M 2250/10
USPC ................... 701/201; 455/552.1; 342/357.64; 370/338
See application file for complete search history.

(56) References Cited

U.S. PATENT DOCUMENTS

| | | | |
|---|---|---|---|
| 6,681,231 B1* | 1/2004 | Burnett | 1/1 |
| 6,801,139 B2* | 10/2004 | Tretyak, Jr. | 340/995.23 |
| 7,395,153 B1 | 7/2008 | Nesbitt et al. | |
| 2001/0024951 A1* | 9/2001 | Rignell et al. | 455/414 |
| 2002/0006793 A1* | 1/2002 | Kun-Szabo et al. | 455/426 |
| 2002/0072395 A1* | 6/2002 | Miramontes | 455/566 |
| 2008/0139219 A1* | 6/2008 | Boeiro et al. | 455/456.2 |
| 2009/0098903 A1* | 4/2009 | Donaldson et al. | 455/552.1 |

* cited by examiner

*Primary Examiner* — James Trammell
*Assistant Examiner* — James E Stroud
(74) *Attorney, Agent, or Firm* — James J. DeCarlo; Greenberg Traurig, LLP (57) ABSTRACT

An example of a method includes determining, electronically, a source location and a destination location in response to an input received through one of a first short message service (SMS) and a general packet radio service (GPRS). The method also includes determining, electronically, a first milestone between the source location and the destination location. Further, the method includes sending directions to reach the first milestone from the source location through a second SMS and an identifier associated with the first milestone. Furthermore, the method includes detecting when to send directions to reach one of a second milestone and the destination location from the first milestone. In addition, the method includes sending directions to reach one of the second milestone and the destination location through a third SMS based on detecting.

15 Claims, 9 Drawing Sheets

METHOD AND SYSTEM FOR PROVIDING DRIVING DIRECTIONS

BACKGROUND

Over a period of years, use of mobile phones has increased. Many applications that were accessible through computers and laptops are now accessible through the mobile phones also. One of the applications includes providing driving directions to a user of a mobile phone. The driving directions can be obtained by the user by accessing various online applications, for example Google® Maps, Yahoo! ® Maps, and MapQuest®. However, in order to access the online applications, internet connectivity is required which may not always be feasible and available to the user of the mobile phone.

The driving directions can also be obtained by the user through a global positioning system (GPS) receiver present in the mobile phone. However, the GPS receiver increases cost of the mobile phone and also may not be feasible in some scenarios.

SUMMARY

An example of a method includes determining, electronically, a source location and a destination location in response to an input received through one of a first short message service (SMS) and a general packet radio service (GPRS). The method also includes determining, electronically, a first milestone between the source location and the destination location. Further, the method includes sending directions to reach the first milestone from the source location through a second SMS and an identifier associated with the first milestone. Furthermore, the method includes detecting when to send directions to reach one of a second milestone and the destination location from the first milestone. In addition, the method includes sending directions to reach one of the second milestone and the destination location through a third SMS based on detecting.

Another example of a method includes sending a first request for receiving directions to a destination location from a source location through one of a first short message service and a general packet radio service (GPRS). The method also includes receiving an identifier associated with a first milestone and the directions to reach the first milestone from the source location. Further, the method includes displaying the directions to reach the first milestone from the source location in text format on a display of an electronic device. Furthermore, the method includes detecting presence of the electronic device at the first milestone based on the identifier associated with the first milestone. In addition, the method includes sending a second request for receiving directions to the destination location from the first milestone.

An example of a server includes a server communication interface. The server also includes a server memory to store server instructions. Further, the server includes a server processor coupled to the server memory. The server processor is responsive to the server instructions to determine a source location and a destination location in response to an input received. The input is received through one of a first short message service (SMS) and a general packet radio service (GPRS). The server processor is also responsive to the server instructions to determine a first milestone between the source location and the destination location. Further, the server processor is responsive to the server instructions to send directions, in conjunction with the server communication interface, to reach the first milestone from the source location through a second SMS. Furthermore, the server processor is responsive to the server instructions to send an identifier associated with the first milestone in conjunction with the server communication interface. In addition, the server processor is responsive to the server instructions to detect when to send directions to reach one of a second milestone and the destination location from the first milestone. The server processor is responsive to the server instructions to send directions, in conjunction with the server communication interface, to reach one of the second milestone and the destination location, through a third SMS based on detecting.

DETAILED DESCRIPTION OF THE EMBODIMENTS

Figure 1:
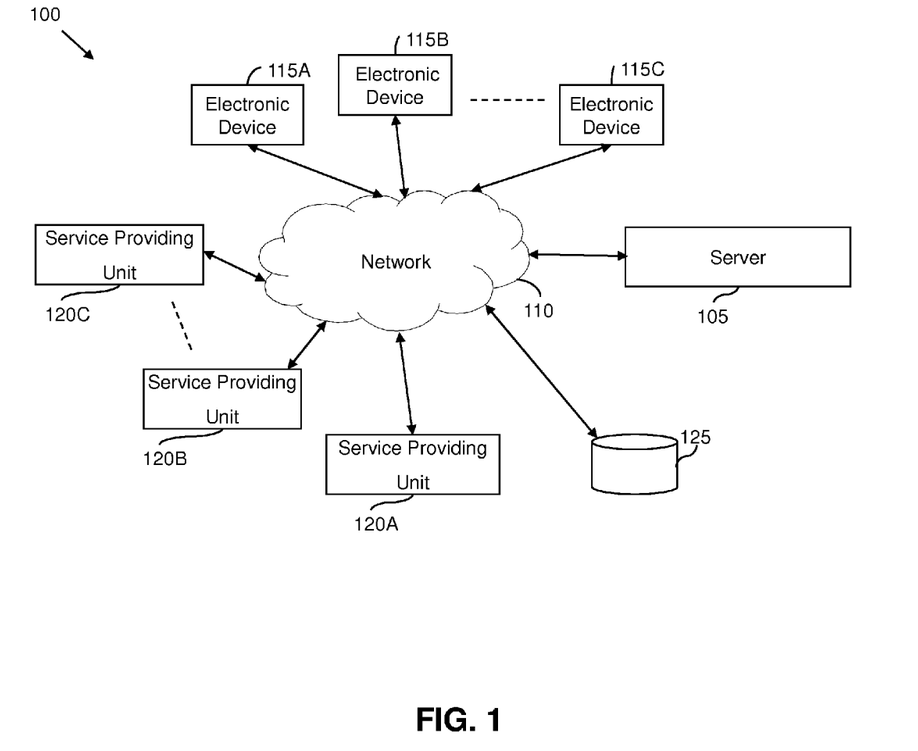
FIG. 1 is a block diagram of an environment, in accordance with one embodiment.

FIG. 1 depicts a block diagram of an environment 100. The environment 100 includes a server 105, for example a Yahoo!® server, connected to a network 110. The environment 100 further includes one or more electronic devices, for example an electronic device 115A, an electronic device 115B, and an electronic device 115C that can communicate with each other through the network 110. An example of the electronic devices includes a mobile phone. The electronic devices can also communicate with the server 105 through the network 110.

The environment 100 includes one or more service providing units or one or more service provider devices, for example a service providing unit 120A, a service providing unit 120B, and a service providing unit 120C. The service providing units can communicate with the server 105 through the network 110. The service providing units can also communicate with the electronic devices through the network 110. The service providing units, for example the service providing unit 120A, can be administered by a mobile phone service provider.

The server 105 can be coupled to a storage device 125 through the network 110.

An example of interaction among various entities of the environment 100 is now provided.

A user of an electronic device, for example the electronic device 115A, may desire to obtain driving directions from a source location to a destination location. An application that provides driving directions can be downloaded on the electronic device 115A. The application can be downloaded from various sources, for example a website. After downloading, the application can be enabled by the user to run on the electronic device 115A. The user may also need to register for a service for obtaining the driving directions through the electronic device 115A to get access to the application. The registration can be performed with a mobile phone service provider associated with the electronic device 115A or with a service provider of the server 105. In one embodiment, the server 105 stores a phone number of the electronic device 115A in the storage device 125 after the registration of the electronic device 115A with the server 105.

The server 105 can have a tie up with the mobile phone service provider for providing the driving directions. The server 105 then stores information associated with the mobile phone service provider in the storage device 125. For example, the server 105 obtains one or more cell identifications (IDs), also referred to as identifiers, of the mobile phone service provider and stores the cell IDs in the storage device 125. Each cell ID is an identification code allocated by the mobile phone service provider to a location where the mobile phone service provider operates. The server 105 also obtains geographical boundaries associated with the mobile phone service provider based on the cell IDs.

The mobile phone service provider can also allow the user to download the application on the electronic device 115A after registration with the server 105. All communications between the server 105 and the electronic device 115A are routed through the mobile phone service provider.

The application running on the electronic device 115A enables communication between the server 105 and the electronic device 115A. The application enables the user to send requests as inputs to the server 105 to obtain the driving directions in text format. The request can be sent by the user through a short message service (SMS), for example a first SMS, or a general packet radio service (GPRS).

In one embodiment, the first SMS includes the source location and the destination location in the text format. In another embodiment, the first SMS includes only the destination location.

The server 105 receives the first SMS and determines the mobile phone service provider associated with the first SMS based on the phone number of the electronic device 115A stored in the storage device 125. The server 105 then extracts the text specifying the source location and the destination location from the first SMS. In one example, the server 105 expects the message to follow a fixed convention. One such convention could be SRC:source name, DST:destination_name. The server 105 then parses the message and extracts the source and destination locations.

It might happen that the first SMS includes only the destination location. In such a case the server 105 determines the source location based on the cell ID associated with the electronic device 115A. The application running on the electronic device 115A periodically updates the cell ID associated with a current location of the electronic device 115, to the server 105 in the text format. The server 105 can store the updated cell ID in the storage device 125 and obtain the source location accordingly. For example, if the user is in an area A1 and the cell ID associated with the area A1 is C1, then the application updates the server that the user is in the area A1 and the cell ID for the area A1 is C1. The server receives the update and stores the area A1 and its associated cell ID C1 in the storage device. Similarly, as the user moves ahead and reaches an area A2 having a cell ID C2 then the application updates the server that the user is in the area A2 and the cell ID for the area A2 is C2. The server receives the update and stores the area A2 and its associated cell ID C2 in the storage device. In such a case, if the first SMS is received when the user is in the area A2 then the server automatically obtains the latest update (the area A2 with cell ID C2) from the application to determine the source location of the user.

The server 105 maps the source location and the destination location to corresponding geospatial entity object codes (GEOCODES) in order to generate a route map from the source location to the destination location. The server 105 determines one or more milestones between the source location and the destination location based on the route map. The server 105 obtains the cell IDs of the mobile phone service provider associated with the source location, the destination location, and the milestones from the storage device 125.

The server 105 sends a second SMS to the electronic device 115A. The second SMS includes the driving directions to reach a first milestone of the milestones from the source location, in the text format. The first milestone can be a closest landmark to the source location. The server 105 also sends the cell ID of the mobile phone service provider, associated with the first milestone, to the electronic device 115A.

The electronic device 115A receives the second SMS from the server 105. The second SMS can be displayed to the user on a display of the electronic device 115A. The user can follow the driving directions provided in the second SMS. The cell ID of the mobile phone service provider associated with the first milestone is processed by the application. The application running on the electronic device 115A continuously tracks the cell ID of the location of the electronic device 115A. When the cell ID is similar to that associated with the first milestone then the application detects that the user has reached the first milestone.

In some embodiments, the server 105 also estimates a first time period based on various parameters, for example number of requests that are received from various users and that are associated with the first milestone. The number of requests is indicative of traffic congestion and hence, the server can estimate a higher time period when number of requests received is more as compared to that when number of requests received is less.

It might happen that the user reaches the first milestone before expiry of the first time period. In such scenario, the application running on the electronic device 115A identifies the cell ID associated with the first milestone before expiry of the first time period. The application automatically sends another request (also referred to as another input or a second request) to the server 105. The another request is for obtaining driving directions to reach the destination location from the first milestone. The another request can be sent through an SMS or a GPRS in the text format.

The server 105 receives the another request and sends a third SMS to the electronic device 115A. The third SMS includes the driving directions to reach the destination location from the first milestone in the text format. The server 105 may also send the cell ID of the mobile phone service provider associated with the destination location.

The server 105 also keeps track of the expiry of the first time period. If the server 105 has not received the another request and the first time period has expired, then the server 105 sends the third SMS to the electronic device 115A.

The electronic device 115A receives the third SMS from the server 105. The third SMS can be displayed to the user on the display of the electronic device 115A. The user can follow the driving directions provided in the third SMS to reach the destination location from the first milestone. The cell ID of the mobile phone service provider associated with the destination location is processed by the application.

In some embodiments, the user can read the cell ID of the mobile phone service provider associated with the destination location displayed on the electronic device 115A, when he is close to the destination location, to confirm that he is close to the destination location.

In some embodiments, if the user does not reach the destination location within a second time period provided by the server 105, then the user can send a request to the server 105 through an SMS. The request can be for the server 105 to track and determine current location of the user and provide driving directions to reach the destination location in the text format. The server 105 receives the request and determines the current location of the user based on the periodic updates received from the application. The server 105 then provides the driving directions to reach the destination location from the current location through an SMS.

It is noted that, if the server 105 determines more than one milestone between the source location and the destination location then the above procedure of sending SMS along with respective cell ID of the mobile phone service provider, and estimated time periods for reaching the first milestone and the destination location is repeated until the user reaches the destination location.

In some embodiments, the first time period can be estimated based on multiple requests received from the electronic devices. For example, the server 105 may receive requests from the electronic device 115B and the electronic device 115C for directions to reach the destination location from the source location. The server 105 estimates that there are the multiple requests for providing directions to reach the destination location via the first milestone from the source location. The server 105 can then estimate that due to the multiple requests number of users travelling from the source location to the destination location via the first milestone is more. Hence there can be congestion leading to increased travel time. The server 105 determines an alternative milestone between the source location and the destination location to reduce the travel time. The server 105 then sends driving directions to the electronic device 115B to reach the destination location from the source location via the alternative milestone. The server 105 also sends driving directions to the electronic device 115C to reach the destination location from the source location via the first milestone.

In one embodiment, the server 105 receives one or more requests from vendors to advertise or quote their company names as landmarks while proving driving directions to users. Thus the server 105 can build monetization model based on the requests from the vendors.

Figure 2:
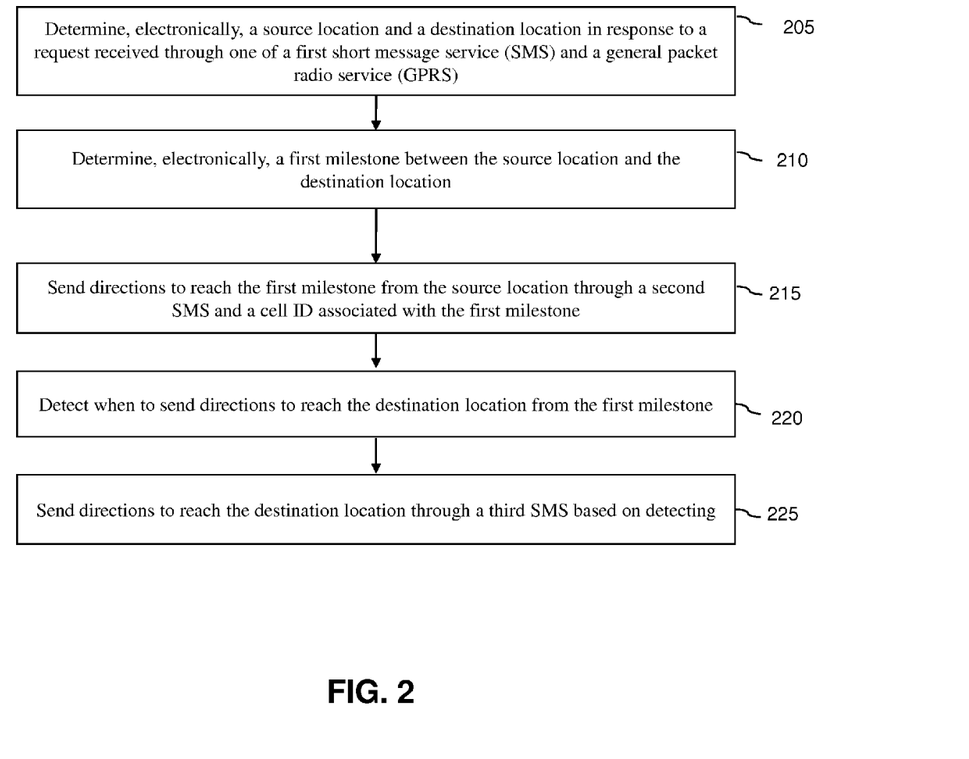
FIG. 2 is a flow diagram illustrating a method for providing directions for driving, in accordance with one embodiment.

FIG. 2 depicts a method for providing driving directions by a server, for example the server 105, to a user of an electronic device, for example the user of the electronic device 115A.

The user of the electronic device desires to obtain the driving directions from the source location to the destination location. The user downloads an application, for example from a website. The user then enables the application and the application runs on the electronic device. The user sends a request (also referred to as a first request) to the server to obtain the driving directions through the first SMS.

At step 205, the source location and the destination location are electronically determined in response to the request received through the first SMS or the general packet radio service (GPRS).

In one example, the first SMS can include the text "driving directions to reach airport road from white field". The server receives the request through the first SMS. The server identifies the text "airport road" as the destination location and the text "white field" as the source location. The server maps the source location and the destination location to corresponding GEOCODES in order to generate the route map from the source location to the destination location.

The server determines the mobile phone service provider associated with the first SMS. The server can also communicate with the mobile phone service provider to authenticate the user. The server determines one or more milestones between the source location and the destination location based on the route map. The server determines the cell IDs of the mobile phone service provider functioning close to the source location, the destination location, and at least one milestone from a storage device, for example the storage device 125.

It may happen that, the user has only mentioned the destination location in the first SMS. In such a scenario, the server obtains the source location of the user from the storage device, as the storage device stores the periodic updates received from the application.

At step 210, the first milestone is electronically determined between the source location and the destination location. The server determines the first milestone based on the route map. The server identifies the cell ID associated with the first milestone based on network availability of the mobile phone service provider.

At step 215, driving directions to reach the first milestone from the source location are sent through the second SMS and the cell ID associated with the first milestone is also sent along with the second SMS. The cell ID associated with the first milestone may not be displayed to the user but can be sent as a separate packet to the electronic device 115A and can be processed by the application. The packet can be sent through GPRS.

The server sends the driving directions to reach the first milestone "XYZ tower" from the source location "airport road" through the second SMS in the text format. For example, the second SMS includes the text "take second left from your current position and then take third right to reach XYZ towers". The server also sends, electronically, the cell ID associated with the first milestone "XYZ towers" to the user. The second SMS is displayed to the user on a display of the electronic device and the cell ID is processed by the application on the electronic device.

At step 220, when to send the directions to reach the destination location from the first milestone to the electronic device is detected. The server estimates a time period (also referred to as the first time period) based on the various parameters, for example the number of requests received by the server to provide driving directions to reach the first milestone from the source location.

At step 225, directions are sent to reach the destination location through the third SMS based on detecting. The server identifies a cell ID closest to the destination location. The server sends the third SMS to the user after the expiry of the time period.

It might happen that the user reaches the first milestone before expiry of the first time period. In such scenario, the application running on the electronic device detects or identifies that the cell ID of the electronic device matches the cell ID of the first milestone, before expiry of the first time period. The application then automatically sends the another request to the server. The another request is for obtaining driving directions to reach the destination location from the first milestone. The another request can be sent through an SMS or a GPRS in the text format. The server receives the another request and sends the third SMS to the electronic device 115A.

In some embodiments, the server can receive request for driving directions to only one destination location at a time. If the user requests for driving directions to reach another destination location, then the server terminates current communication and starts providing driving directions to reach the other destination location.

In one embodiment, the server also identifies a milestone that has minimum traffic congestion on a route between the first milestone and the destination location and considers the milestone as a second milestone.

Figure 3:
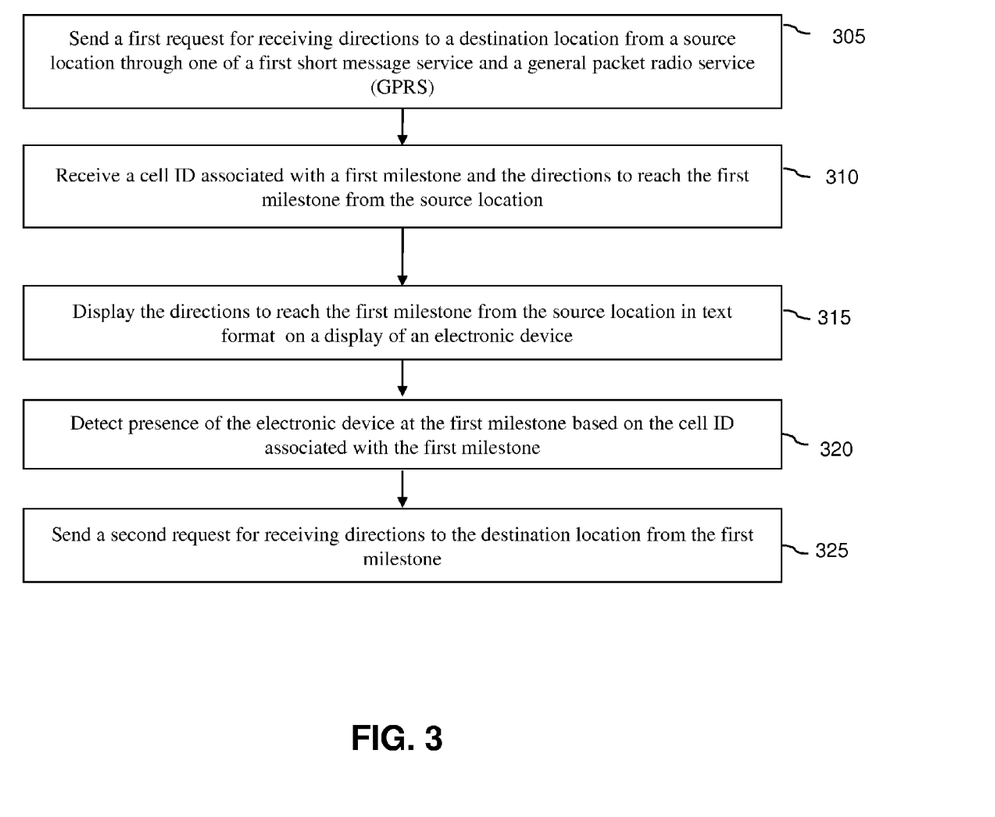
FIG. 3 is a flow diagram illustrating a method for requesting driving directions, in accordance with one embodiment.

FIG. 3 depicts a method for requesting driving directions by a user of an electronic device, for example the user of the electronic device 115A, to a server, for example the server 105.

At step 305, a first request for receiving directions to reach the destination location from the source location is sent by the user through the first SMS or the GPRS. The user can obtain the driving directions in the text format by downloading the application on the electronic device. The application can be enabled by the user to run on the electronic device. The application running on the electronic device enables the user to electronically communicate with the server to receive the driving directions in the text format through the first SMS or the GPRS.

It is noted that the user of the electronic device can be a customer of any mobile phone service provider. The mobile phone service provider is capable of enabling electronic communication between the server and the electronic device for the electronic device to receive the driving directions.

At step 310, the cell ID associated with the first milestone and the driving directions to reach the first milestone from the source location are received by the electronic device.

The driving directions to reach the first milestone from the source location are received through the second SMS in the text format. The cell ID associated with the first milestone may not be displayed to the user but can be sent as a separate packet to the electronic device and is processed by the application. The packet can be sent through the GPRS which is accessed by the application.

At step 315, the driving directions to reach the first milestone from the source location are displayed in the text format on the display of the electronic device. For example, the text can be "take second left from your current position, go straight, take third right to reach XYZ tower", where "XYZ tower" is the first milestone.

In one example, the user receives the second SMS in the electronic device. The user can click on an option "view" to see the second SMS. The user can read and follow the driving directions provided in the second SMS in order to reach the first milestone.

At step 320, presence of the electronic device is detected at the first milestone based on the cell ID associated with the first milestone.

In one example, as the user follows the driving directions provided in the second SMS the application running on the electronic device continuously tracks cell ID associated with a current location of the electronic device. If the cell ID associated with the current location matches the cell ID associated with the first milestone, then the application detects that the user is close to the first milestone.

At step 325, the second request is sent for receiving driving directions to the destination location from the first milestone.

In one example, the application running on the electronic device automatically enables the electronic device to send the another request after detecting the cell ID associated with the current location matches the cell ID associated with the first milestone.

In one embodiment, the application running on the electronic device automatically enables the electronic device to send multiple requests similar to the another request corresponding to number of milestones between the first milestone and the destination location.

Figure 4:
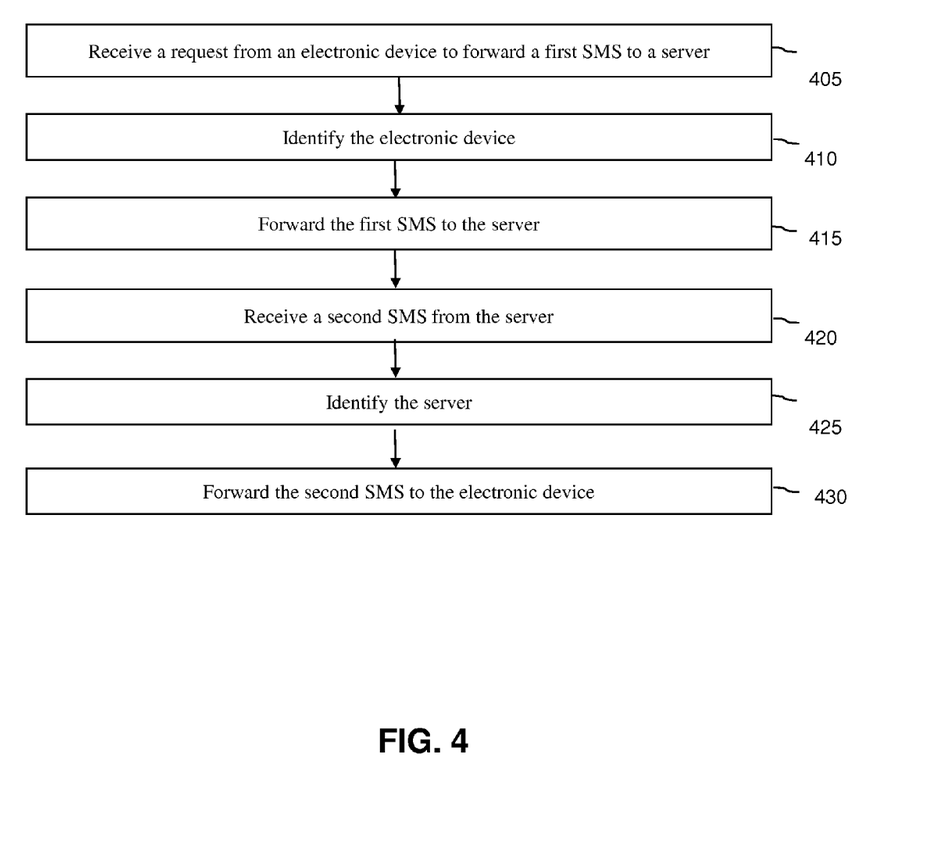
FIG. 4 is a flow diagram illustrating a method for providing driving directions, in accordance with another embodiment.

FIG. 4 depicts a method for providing driving directions by a server, for example the server 105, through a service providing unit, for example the service providing unit 120A, to a user of an electronic device, for example the user of the electronic device 115A.

The service providing unit can be administered by the mobile phone service provider and can communicate with the server and the user. The mobile phone service provider can have a tie up with the server for providing the driving directions to the user. The service providing unit can receive a request from the user to register the electronic device with the server to obtain the driving directions. The service providing unit allows the server to access all the information associated with the user, for example geographical limitation of the mobile phone service provider for the user to access mobile phone service. The service providing unit also allows the server to access cell IDs of the mobile phone service provider.

At step 405, a request is received by the service providing unit from the electronic device to forward the first SMS to the server.

At step 410, the electronic device is identified. The service providing unit can identify the electronic device based on subscriber identity module (SIM) card information of the user of the electronic device. The SIM card information can be stored in a database by the service providing unit. The service providing unit also determines if the user of the electronic device is registered with the server to send the first SMS.

At step 415, the first SMS is forwarded to the server. If the user is registered with the server then the service providing unit forwards the first SMS to the server.

At step 420, the second SMS is received from the server by the service providing unit.

At step 425, the server is identified by the service providing unit. The service providing unit checks if the server has a tie-up with the service providing unit.

At step 430, the second SMS is forwarded to the electronic device by the service providing unit.

In one embodiment, the service providing unit allows the access of the user information, for example the user mobile number, and geographical limitation and cell IDs to the server for providing the driving directions to the user.

In some embodiments, the service providing unit can also receive a request from the server. The request can be to determine cell IDs associated with the source location and the destination location if the server is unable to obtain the cell IDs from a storage device, for example the storage device 125. The cell IDs are required by the server to provide the driving directions to the user through the second SMS.

Figure 5A:
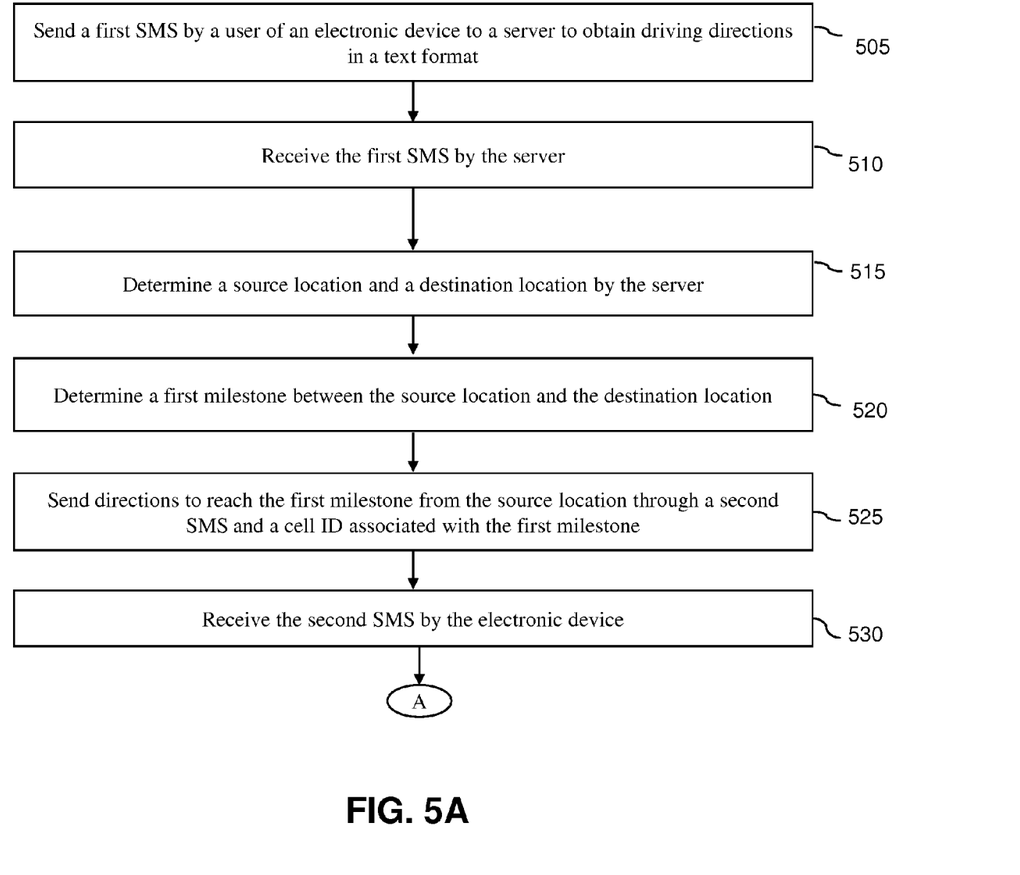
FIG. 5 is a flow diagram illustrating a method for providing driving directions, in accordance with yet another embodiment.
Figure 5B:
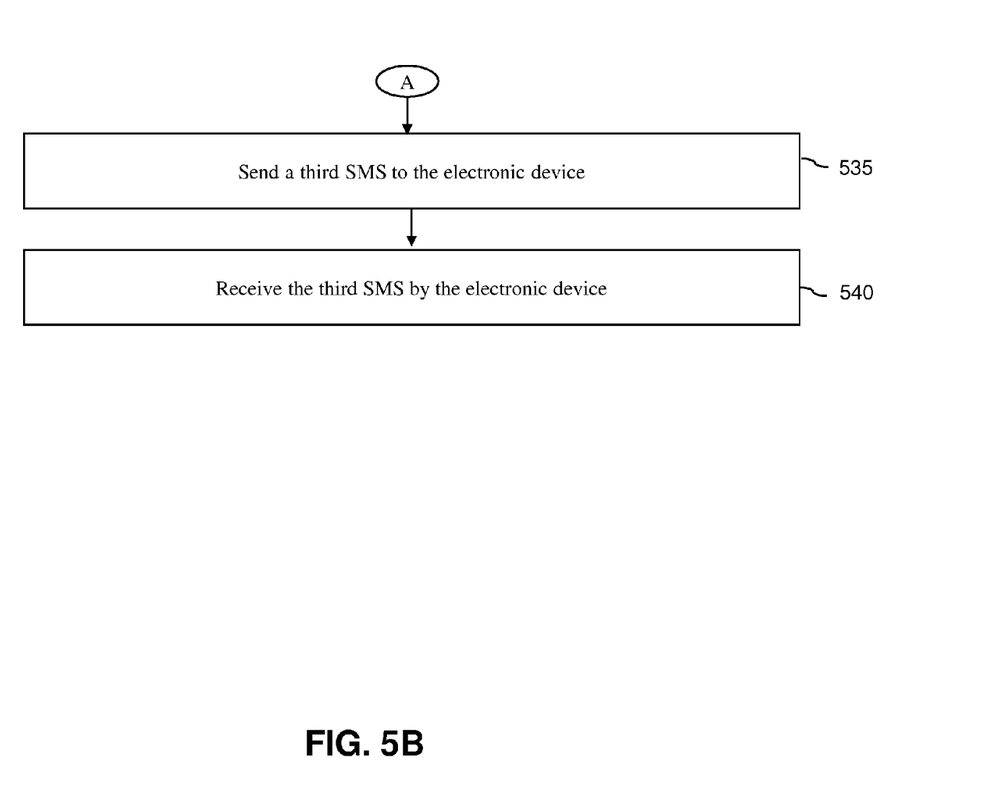

FIG. 5 depicts a method for providing driving directions by a server, for example the server 105 to a user of an electronic device, for example the electronic device 115A. Communication between the server and the electronic device can be routed through a service providing unit, for example the service providing unit 120A.

The user desires to obtain the driving directions to reach the destination location from the source location. The user can register for a service provided by the server and obtain the driving directions. The server and the mobile phone service provider associated with the user can have a tie up to authenticate registration of the user for the service. The mobile phone service provider can also allow the user to download the application in the electronic device to enable communication between the user and the server. The user can send the request to obtain the driving directions.

At step 505, the first SMS is sent by the user of the electronic device to the server to obtain the driving directions in the text format.

At step 510, the first SMS is received by the server. The server may co-ordinate with the service providing unit in order to obtain the mobile phone service provider associated with the first SMS.

At step 515, the source location and the destination location are determined by the server. The server extracts the text of the source location and the destination location from the first SMS and GEOCODES the source location and the destination location to obtain the route map. The server also obtains cell IDs associated with the source location and the destination location from a storage device storing all cell IDs of the mobile phone service provider.

It is noted that, if the user does not mention the source location in the first SMS then the server determines the source location based on updated cell IDs provided by the application and stored in the storage device. For example, the application periodically updates location of the electronic device to the server. The server stores the periodic updates in the storage device.

At step 520, the first milestone is electronically determined between the source location and the destination location. The server determines the first milestone based on the route map. The server also estimates the first time period.

At step 525, directions to reach the first milestone from the source location and the cell ID associated with the first milestone are sent through the second SMS.

At step 530, the electronic device receives the second SMS. The user can follow the driving directions provided in the second SMS and reach the first milestone.

At step 535, the third SMS is sent to the electronic device by the server after expiry of the first time period.

Alternatively, the application running on the electronic device determines if the cell ID associated with the first milestone is detected as cell ID associated with a current location of the electronic device, before the expiry of the first time period. If the cell ID associated with the first milestone matches the cell ID associated with the current location then the application automatically enables the electronic device to send the another request to the server. The server receives the another request and sends the third SMS to the electronic device.

At step 540, the third SMS is received by the electronic device. The user can follow the driving directions provided in the third SMS to reach the destination location.

In one embodiment, the server determines if the user has reached the destination location based on estimating a travel time between the first milestone and the destination location. The server can send an SMS to the electronic device after the expiry of the estimated travel time. The SMS can include an option to obtain user feedback once the user reaches the destination location. The feedback can include a rating out of ten. The user can rate the services provided by the server. For example, if the service provided by the server was average then the user can rate the service as five out of ten and send the feedback through the SMS to the server. The server can improve the service of providing driving directions based on the ratings.

In one embodiment, the server also determines traffic congestion based on number of requests for obtaining driving directions to reach the first milestone from the source location. If the traffic is minimal, the server provides the driving directions to the user to reach the first milestone from the source location else the server provides driving directions to the user to reach an alternative milestone from the source location. The server also provides driving directions to the user to reach the destination location from the alternative milestone.

Figure 6:
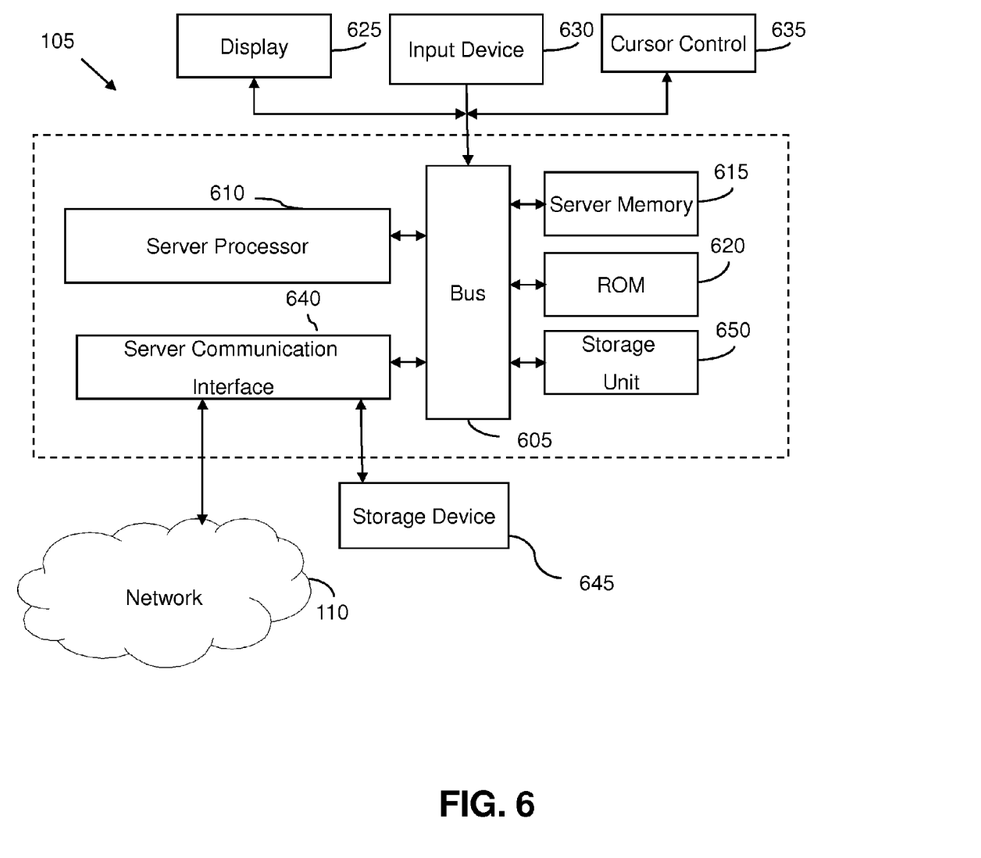
FIG. 6 is a block diagram of a server, in accordance with one embodiment.

FIG. 6 depicts a block diagram of the server 105. The server 105 includes a bus 605 for communicating information, and a server processor 610 coupled with the bus 605 for processing information. The server 105 also includes a server memory 615, for example a random access memory (RAM) coupled to the bus 605 for storing instructions to be executed by the server processor 610. The server memory 615 can be used for storing temporary information required by the server processor 610. The server 105 further includes a read only memory (ROM) 620 or other static storage unit coupled to the bus 605 for storing static information and instructions for the server processor 610. A storage unit 650, such as a magnetic disk or hard disk, can be provided and coupled to the bus 605 for storing information.

The server 105 can be coupled via the bus 605 to a display 625, for example a cathode ray tube (CRT) or liquid crystal display (LCD), for displaying information. An input device 630, including various keys, is coupled to the bus 605 for communicating information and command selections to the server processor 610. In some embodiments, a cursor control 635, for example a mouse, a trackball, a joystick, or cursor direction keys, for command selections and for controlling cursor movement on the display 625 can also be present. In some embodiments, the display 625, for example a touch screen, can be used to provide inputs.

Various embodiments are related to use of the server 105 for implementing techniques described earlier, for example technique described in FIG. 2. The techniques can be performed by the server 105 in response to execution of instructions in the server memory 615 by the server processor 610. The instructions can be read into the server memory 615 from another machine-readable medium, such as the storage unit 650.

The term machine-readable medium can be defined as a medium providing data to a machine to enable the machine to perform a specific function. The machine-readable medium can include storage media. Storage media can include non-volatile media and volatile media. The server memory 615 can be volatile media. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 605. The machine-readable medium can also support radio-wave and infra-red data communications that generate acoustic or light waves. Other examples of the machine-readable medium can include but are not limited to carrier waves as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 605. The bus 605 carries the data to the server memory 615, from which the server processor 610 retrieves and executes the instructions. The instructions received by the server memory 615 can optionally be stored in the storage unit 650 either before or after execution by the server processor 610.

The server 105 also includes a server communication interface 640 coupled to the bus 605 for enabling data communication. Examples of the server communication interface 640 include, but are not limited to, an integrated services digital network (ISDN) card, a modem, a local area network (LAN) card, an infrared port, a Bluetooth port, a zigbee port, and a wireless port.

The server 105 can be coupled to a storage device 645 that includes the database of cell IDs associated with the milestones, the source location, and the destination location for one or more mobile phone service providers. In some embodiments, the database can be stored in the server 105.

In some embodiments, the server processor 610 can include one or more processing units for performing one or more functions of the server processor 610. The processing units are hardware circuitries that perform specified functions.

Figure 7:
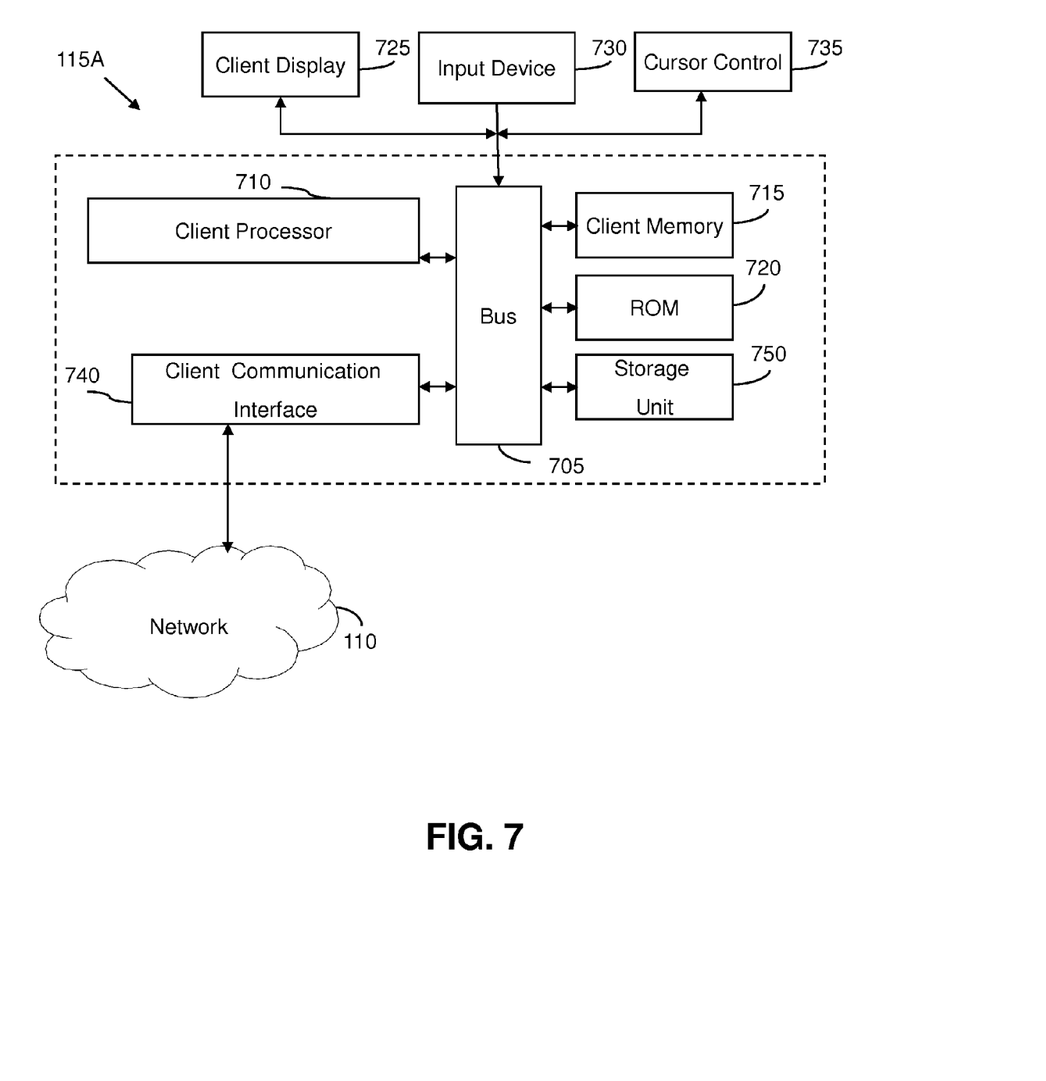
FIG. 7 is a block diagram of an electronic device, in accordance with one embodiment.

FIG. 7 depicts a block diagram of the electronic device 115A. The electronic device 115A includes a bus 705 for communicating information, and a client processor 710 coupled with the bus 705 for processing information. The electronic device 115A also includes a client memory 715, for example a random access memory (RAM), coupled to the bus 705 for storing instructions to be executed by the client processor 710. The client memory 715 can also be used for storing temporary information required by the client client processor 710. The electronic device 115A further includes a read only memory (ROM) 720 or other static storage unit coupled to the bus 705 for storing static information and instructions for the client processor 710.

The electronic device 115A includes a client display 725, for example a cathode ray tube (CRT) or liquid crystal display (LCD), for displaying information. The client display 725 is coupled to the bus 705. An input device 730, including various keys, is coupled to the bus 705 for communicating information and command selections to the client processor 710. In some embodiments, a cursor control 735, for example a mouse, a trackball, a joystick, or cursor direction keys, for command selections and for controlling cursor movement on the client display 725 can also be present. In some embodiments, the client display 725, for example a touch screen, can also provide inputs.

Various embodiments are related to the use of the electronic device 115A for implementing the techniques described earlier, for example technique described in FIG. 3. The techniques can be performed by the electronic device 115A in response to execution of the instructions included in the client memory 715 by the client processor 710.

The electronic device 115A performs tracking of the user's cursor in response to execution of the instructions in the client memory 715 by the client processor 710.

The electronic device 115A also includes a client communication interface 740 coupled to the bus 705 for enabling data communication. Examples of the client communication interface 740 include, but are not limited to, an integrated services digital network (ISDN) card, a modem, an infrared port, a Bluetooth port, and a wireless port.

In some embodiments, the client processor 710 can include one or more processing units for performing one or more functions of the client processor 710. The processing units are hardware circuitries that perform specified functions.

Figure 8:
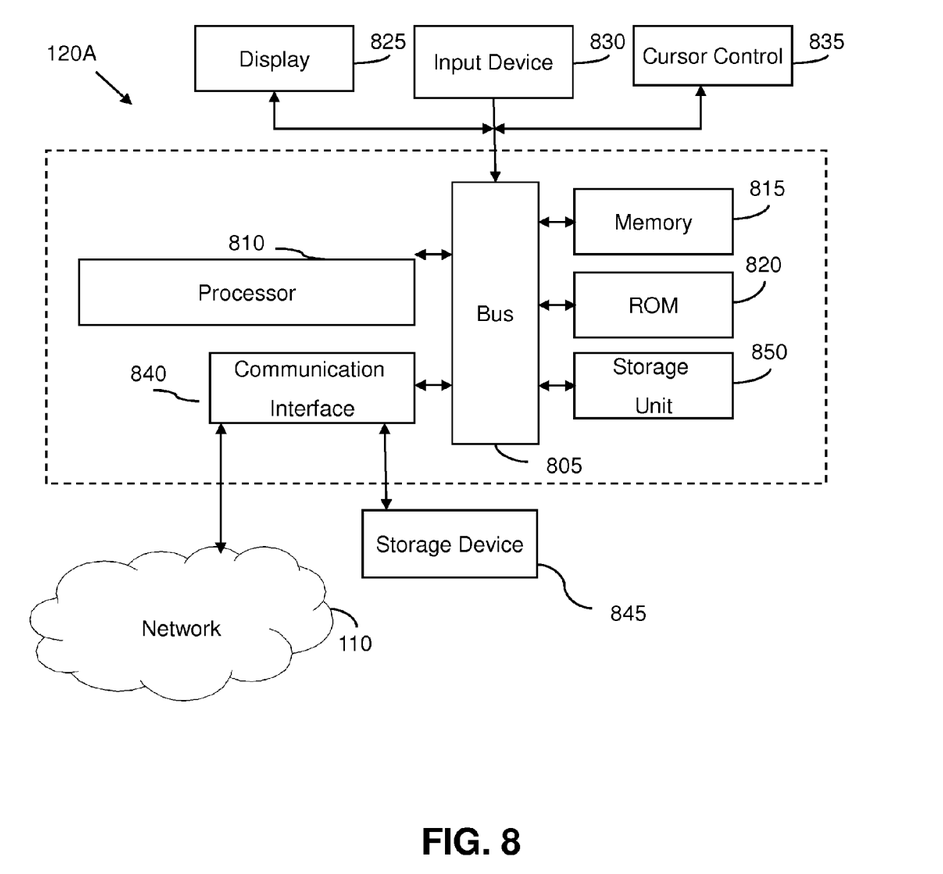
FIG. 8 is a block diagram of a service providing unit, in accordance with one embodiment.

FIG. 8 depicts a block diagram of the service providing unit 120A. The service providing unit 120A includes a bus 805 for communicating information, and a processor 810 coupled to the bus 805 for processing information. The service providing unit 120A also includes a memory 815, for example a random access memory (RAM) coupled to the bus 805 for storing instructions to be executed by the processor 810. The memory 815 can also be used for storing temporary information required by the processor 810. The service providing unit 120A further includes a read only memory (ROM) 820, or other static storage unit, coupled to the bus 805 for storing static information and instructions for processor 810. A storage unit 850, such as a magnetic disk or hard disk, can be provided and coupled to the bus 805 for storing information.

The service providing unit 120A can be coupled via the bus 805 to a display 825, for example a cathode ray tube (CRT) or liquid crystal display (LCD), for displaying information. An input device 830, including various keys, is coupled to the bus 805 for communicating information and command selections to the processor 810. In some embodiments, cursor control 835, for example a mouse, a trackball, a joystick, or cursor direction keys, for command selections to the processor 810 and for controlling cursor movement on the display 825 can also be present. The functioning of the input device 830 can also be performed using the display 825, for example a touch screen.

Various embodiments are related to the use of the service providing unit 120A for implementing the techniques described earlier, for example in FIG. 4. The techniques can be performed by the service providing unit 120A in response to the processor 810 executing instructions included in the memory 815. The instructions can be read into the memory 815 from another machine-readable medium, such as the storage unit 850.

The term machine-readable medium can be defined as a medium providing data to a machine to enable the machine to perform a specific function. The machine-readable medium can be storage media. Storage media can include non-volatile media and volatile media. The memory 815 can be a volatile media. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 805. The machine-readable medium can also support radio-wave and infra-red data communications that generate acoustic or light waves. Other examples of the machine-readable medium can include but are not limited to carrier waves as described hereinafter or any other media from which the service providing unit 120A can read, for example online software, download links, installation links, and online links. For example, the instructions can initially be carried on a magnetic disk of a remote computer. The remote computer can load the instructions into its dynamic memory and send the instructions over a telephone line using a modem. A modem local to the service providing unit 120A can receive the data on the telephone line and use an infra-red transmitter to convert the data to an infra-red signal. An infra-red detector can receive the data carried in the infra-red signal and appropriate circuitry can place the data on the bus 805. The bus 805 carries the data to the memory 815, from which the processor 810 retrieves and executes the instructions. The instructions received by the memory 815 can optionally be stored on the storage unit 850 either before or after execution by the processor 810.

The service providing unit 120A also includes a communication interface 840 coupled to the bus 805 for enabling data communication. Examples of the communication interface 840 include, but are not limited to, an integrated services digital network (ISDN) card, a modem, a local area network (LAN) card, an infrared port, a Bluetooth port, a zigbee port, and a wireless port.

The service providing unit 120A can be coupled to a storage device 845 that stores the database of the records. In some embodiments, the database can be stored in the service providing unit 120A.

In some embodiments, the processor 810 can include one or more processing units for performing one or more functions of the processor 810. The processing units are hardware circuitries that perform specified functions.

A business model can be built using the service provided by the server 105 wherein a local business owner can pay and get his business listed with the service. Since the service provided by the server 105 includes one or more routes, the server 105 can quote different businesses as milestones for different requests when the server 105 gives driving directions to the users. Based on number of times a business has been referred, business hours, and area information, a bidding model can be built for advertisers to get the advertisements listed by the service. Also, as the server 105 has aggregated data associated with traffic congestions, the server 105 can mine the data and get valuable information which can help the government plan many developmental activities for cities such as expanding roads, reducing unnecessary traffic policing, and improving public transportation.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A method comprising:
   determining, by a processor, a source location of a mobile electronic device and a destination location in response to an input received through one of a first short message service (SMS) and a general packet radio service (GPRS);
   receiving, by the processor, a request from a vendor to advertise or quote their company name as a landmark while providing driving directions;
   determining, by the processor, a first milestone between the source location and the destination location, the first milestone being determined in terms of an estimated first time period for reaching the first milestone;
   sending, by the processor, directions to the mobile electronic device to reach the first milestone from the source location through a second SMS and an identifier associated with the first milestone;
   detecting, by the processor, when to send directions to the mobile electronic device to reach one of a second milestone and the destination location from the first milestone, wherein detecting when to send the directions to reach one of the second milestone and the destination location from the first milestone is in terms of expiry of the estimated first time period for reaching the first milestone while the user is still in transit to the first milestone;
   sending, by the processor, directions to the mobile electronic device to reach one of the second milestone and the destination location through a third SMS based on detecting;
   obtaining, by the processor, a cell ID of a mobile phone service provider associated with the destination location; and
   employing, by the processor, the cell ID to confirm that the user is close to the destination location.

2. The method as claimed in claim 1, wherein determining the source location and the destination location comprises:
   determining a service provider associated with the input;
   obtaining identifiers associated with the source location and the destination location based on the service provider; and
   mapping the identifiers associated with the source location and the destination location to corresponding geospatial entity object codes (GEOCODES).

3. The method as claimed in claim 2, wherein each identifier is an identification code allocated by the service provider to a location where the service provider operates.

4. The method as claimed in claim 2, wherein sending the identifier associated with the first milestone comprises
   identifying the identifier associated with the first milestone based on the service provider.

5. The method as claimed in claim 1, wherein detecting when to send directions to reach one of the second milestone and the destination location from the first milestone comprises:
   detecting at least one of
      receipt of another input, and
      expiry of a time period.

6. The method as claimed in claim 5, wherein detecting the expiry of the time period comprises
   estimating the time period based on number of inputs that are received and are associated with the first milestone.

7. The method as claimed in claim 1, wherein sending the direction to reach the second milestone from the first milestone comprises
   identifying a milestone that has minimum traffic congestion on a route between the first milestone and the milestone as the second milestone.

8. The method as claimed in claim 1 and further comprising sending an identifier associated with one of the second milestone and the destination location.

9. A method comprising:
   sending, by a processor, a first request for receiving directions to a destination location from a source location through one of a first short message service and a general packet radio service (GPRS);
   receiving, by the processor, a request from a vendor to advertise or quote their company name as a landmark while providing driving directions;
   receiving, by the processor, an identifier associated with a first milestone between the source location and the destination location and the directions to reach the first milestone from the source location, wherein the directions to reach the first milestone include an estimated first time period for reaching the first milestone;
   generating, by the processor, for display on a display of a mobile electronic device, in text format, the directions to reach the first milestone from the source location;
   detecting, by the processor, presence of the mobile electronic device at the first milestone based on the identifier associated with the first milestone, and detecting, by the processor, whether the estimated first time period for reaching the first milestone has expired;
   sending, by the processor, a second request for receiving directions to the destination location from the first milestone based on whether the estimated first time period for reaching the first milestone has expired while the user is still in transit to the first milestone;

obtaining, by the processor, a cell ID of a mobile phone service provider associated with the destination location; and employing the cell ID to confirm that the user is close to the destination location.

10. A server comprising:
a processor;
a storage medium for tangibly storing thereon program logic for execution by the processor, the stored program logic comprising:
  source and destination location determining logic executed by the processor for determining a source location and a destination location in response to an input received through one of a first short message service (SMS) and a general packet radio service (GPRS),
  landmark receiving logic executed by the processor for receiving a request from a vendor to advertise or quote their company name as a landmark while providing driving directions;
  first milestone determining logic executed by the processor for determining a first milestone between the source location and the destination location, the first milestone being determined in terms of an estimated first time period for reaching the first milestone,
  first milestone sending logic executed by the processor for sending directions to reach the first milestone from the source location through a second SMS and an identifier associated with the first milestone,
  detecting logic executed by the processor for detecting when to send directions to reach one of a second milestone and the destination location from the first milestone,
  second milestone sending logic executed by the processor for sending directions to reach one of the second milestone and the destination location through a third SMS based on detecting, wherein detecting when to send the directions to reach one of the second milestone and the destination location from the first milestone is in terms of expiry of the estimated first time period for reaching the first milestone while the user is still in transit to the first milestone;
  cell ID obtaining logic executed by the processor for obtaining a cell ID of a mobile phone service provider associated with the destination location; and
  employing logic executed by the processor for employing the cell ID to confirm that the user is close to the destination location.

11. The server as claimed in claim 10, wherein the server is in electronic communication with at least one mobile electronic device to receive the input.

12. The server as claimed in claim 10, wherein the storage medium stores identifiers associated with the first milestone, the source location, and the destination location for one or more service providers.

13. The server as claimed in claim 10, wherein the server is in electronic communication with one or more service providing units to fetch identifiers associated with the first milestone, the source location, and the destination location.

14. The method as claimed in claim 7, wherein the identifying a milestone that has minimum traffic congestion includes evaluating traffic congestion for a route including a milestone based on a number of requests by users travelling from the source location to the destination location via the route including the milestone.

15. The method as claimed in claim 9, wherein the displaying the directions includes identifying a milestone that has minimum traffic congestion by evaluating traffic congestion for a route including a milestone based on a number of requests by users travelling from the source location to the destination location via the route including the milestone.

* * * * *